July 26, 1949.  C. E. BENNETT  2,476,953
HIGH-TENSION ELECTRIC POWER CABLE SYSTEM
AND METHOD OF INSTALLING THE SAME
Filed April 16, 1947  2 Sheets-Sheet 1

INVENTOR.
CHARLES E. BENNETT
BY
*James G. Bethell*
ATTORNEY

July 26, 1949. C. E. BENNETT 2,476,953
HIGH-TENSION ELECTRIC POWER CABLE SYSTEM
AND METHOD OF INSTALLING THE SAME
Filed April 16, 1947 2 Sheets-Sheet 2
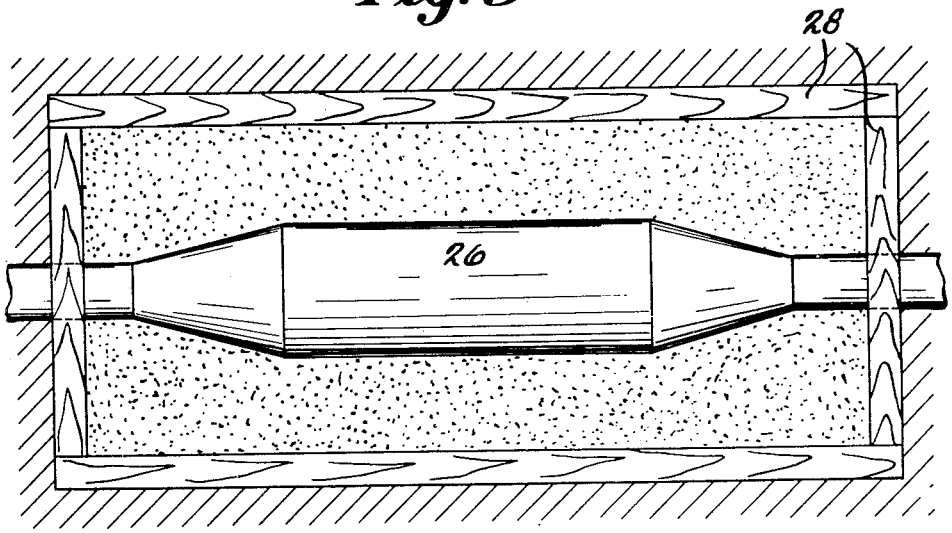
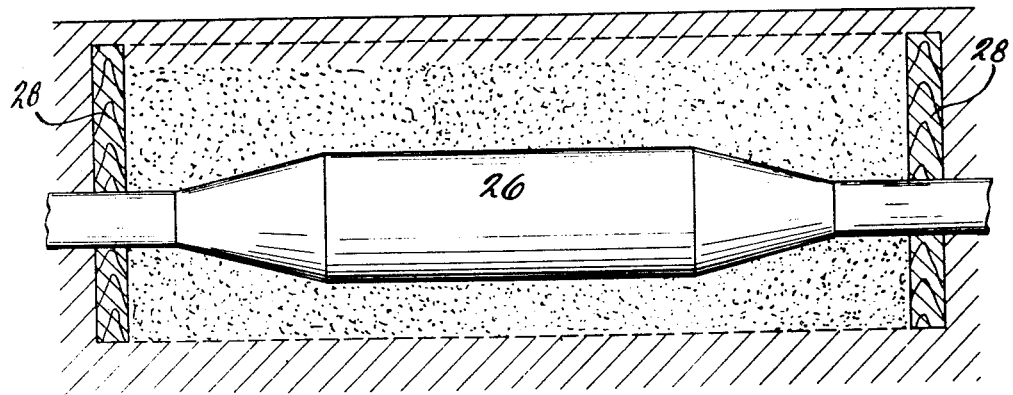
INVENTOR.
CHARLES E. BENNETT
BY James G. Bedwell
ATTORNEY Patented July 26, 1949

2,476,953

UNITED STATES PATENT OFFICE 2,476,953

HIGH-TENSION ELECTRIC POWER CABLE SYSTEM AND METHOD OF INSTALLING THE SAME

Charles E. Bennett, Ridgewood, N. J., assignor to The Okonite-Callender Cable Company, Incorporated, Paterson, N. J., a corporation of New Jersey Application April 16, 1947, Serial No. 741,931

2 Claims. (Cl. 175—376)

This invention relates to buried electric power cable systems, and particularly to the installation of buried high tension electric cable systems wherein one or more insulated conductors are loosely enclosed in a buried pipe line which is kept filled with an insulating fluid maintained under superatmospheric pressure, usually around two hundred or two hundred and twenty-five pounds per square inch.

More particularly my invention is directed to the installing of such systems whereby a very material saving is effected, both in labor and materials.

The pipe line of such electric cable systems of this type is necessarily jointed at intervals. The spacing of these joints depends upon the curves and contours of the line, size and weight of cable, etc., so that in some instances it becomes necessary to provide joints every five or six hundred feet, while in other instances the joints may be spaced two thousand feet.

In any event, regardless of the spacing of the joints, it is necessary under present practice to provide a manhole at each joint and to make up the joints in these manholes. The manholes are usually of cement, brick, etc., oftentimes necessarily reinforced and ventilated, and it is not unusual for them to be as much as sixteen feet long, six feet wide and six or more feet deep. It will be apparent therefore that these structures are expensive and their cost represents a substantial proportion of the cost of the system.

One of the objects of my invention is to provide a method to be employed in installing these systems wherein no manholes are employed and the expense incident to their use eliminated.

In the accompanying drawings illustrative of my invention:

Fig. 5 is a plan view illustrating another embodiment of my invention; and

Fig. 6 is a part sectional elevational view of the structure illustrated in Fig. 5.

Figure 1:
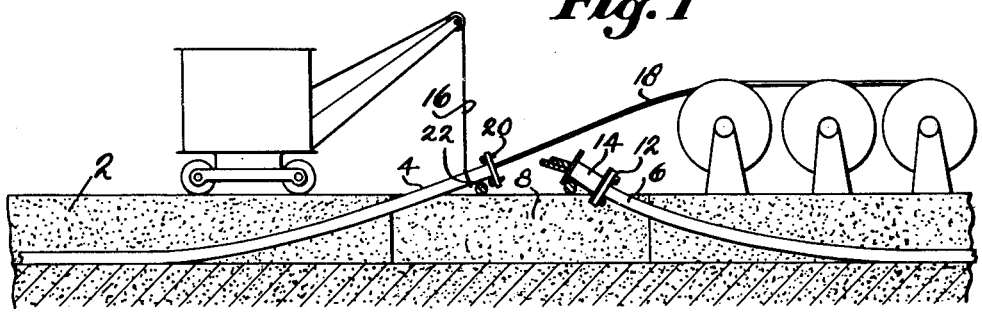
Figs. 1 and 2 are elevational views, partially in section, showing a cable system being installed in accordance with this invention.
Figure 2:
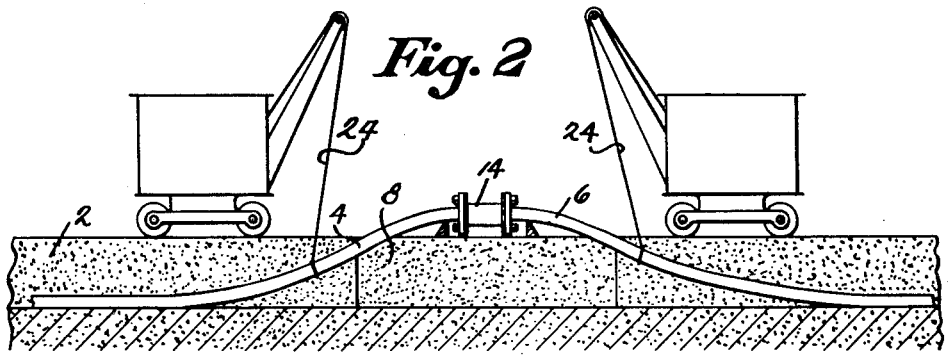
Figure 3:
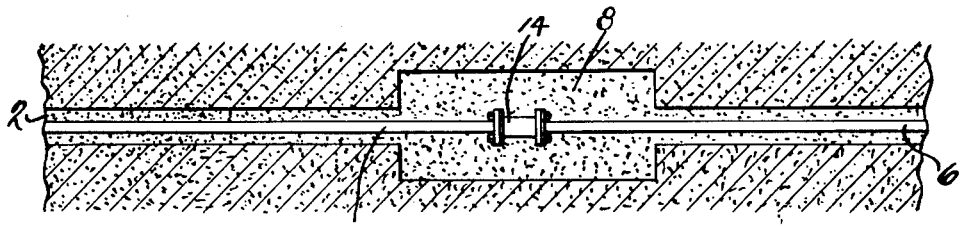
Fig. 3 is a plan view showing the cable system installed.
Figure 4:
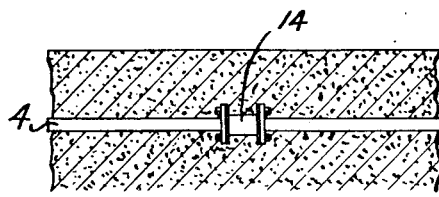
Fig. 4 is an elevational view partially in section of the installation illustrated in Fig. 3.

Referring to the drawings in detail and first of all to Figs. 1 to 4, both inclusive:

In the practice of my invention the trench 2 is first excavated. This trench is narrow, say about seventeen inches wide for a pipe line having an outside diameter of six or seven inches, and is enlarged somewhat in the area 8 where the adjacent ends of two pipe lengths 4 and 6 are to be jointed. This enlargement in the trench need not be of any regular shape and is made large enough for one or two men to stand in it in the final stages of making up the joint.

After the trench has been excavated the pipe lengths are dropped thereinto.

I then attach a lifting line 16 to one of the pipe lengths near the free end of the same and raise the end of the pipe length to above ground level, and with the end of the pipe length in this position I draw the insulated cable conductors 18 thereinto. The flange 20 of the joint may have been slipped over the end of the pipe length before the conductors were drawn in or afterwards, whichever is desired. With a bar 22 laid across the trench the line 16 may be slacked off until the end of the pipe length rests upon this bar.

The same procedure is followed with the pipe length 6, the flange 12 and sleeve 14 of the joint being slipped over the end of this pipe length either before or after the cable conductors have been pulled in.

I next apply a lifting line 24 to each pipe length simultaneously some distance from the free ends of the pipe lengths. The pipe lengths are of steel and hence are flexible, so that by applying a lifting effort some distance to the rear of their free ends, these ends will sag to bring them sufficiently into alignment with each other to enable the joint to be made up above ground, that is the conductors spliced and the flange on the joint sleeve 14 bolted to the joint flange 20. The joint bolts are not fully set up however, so that when the jointed portion of the pipe line is dropped into the trench there is sufficient slippage in the joint to allow the pipe lengths to straighten out in proper alignment with each other. A workman may then drop into the trench and draw up the joint bolts.

The trench may now be backfilled including the area 8 about the joint. This area I prefer to backfill with cinders or sand or other material having low cohesive characteristics, although this area may be backfilled with the same material as the rest of the trench if desired.

It will be apparent from the foregoing that in the practice of my invention the joint is completely made up above ground. Not only is this much more convenient and efficient than present practice where manholes are employed and where the joints are made up in these manholes, but much less expensive. It will be appreciated also that inasmuch as these installations are made outside, water may accumulate in the trench. Under conventional practice it would be necessary to remove the water before work could proceed, but under my method the work is done above ground so that the presence of water in the trench is immaterial.

In describing my invention, the joint sleeve is coupled to the pipe line. This is merely for illustrative purposes. The same procedure is followed with a welded joint, where the joint sleeve is welded to the pipe lengths instead of coupled to them. When making up a welded joint, the conductors are spliced and the joint sleeve slipped over the adjacent ends of the pipe lengths above ground. Welding of the sleeve to the pipe lengths is done in the trench and is comparable to the final take-up on the bolts in the last stage of making up the coupled joint above described.

In Figs. 5 and 6 I have illustrated another embodiment of the invention wherein I eliminate manholes also.

In this embodiment of the invention I have shown a welded joint 26 instead of the joint illustrated in Figs. 1 to 4. As above explained, the joint can be made up above ground except for welding which would be done in the trench. If a coupled joint is employed the procedure is the same as in Figs. 1 to 4. In practicing the invention of Figs. 5 and 6 I install cribbing, such as creosoted planking 28 about the joint and backfill with cinders or sand. This procedure eliminates manholes, and inasmuch as the cribbing is inexpensive as compared with manhole construction, and inasmuch as the joint is made up above ground except for the welding operation or the final setting up of the coupling bolts as the case may be, it will be quite obvious that the expense of installation is very materially reduced as compared with conventional practice.

It will be appreciated that in all cases the pipe line is filled with insulating fluid after the cable conductors have been spliced, the pipe lengths jointed, and the assembly dropped into the trench.

From all of the foregoing it will be seen that my invention provides for the installation of buried cable systems wherein manholes are entirely eliminated.

What I claim is:

1. The method of installing buried electric cable systems of the type wherein the cable conductors are enclosed in a jointed pipe line filled with an insulating fluid under pressure, which method comprises placing sections of the pipe line in a trench, raising the adjacent ends of two adjacent pipe lengths above the top of the trench and while the pipe sections are in this position drawing cable conductors into each pipe section, then applying a lifting force to the pipe lingths at a point sufficiently remote from their ends as to allow the free ends of the pipe lengths to sag to bring them into substantial alignment with each other above the top of the trench, splicing the conductors and jointing the pipe section ends, then placing the jointed structure in the trench and backfilling.

2. The method of installing buried electric cable systems of the type wherein the cable conductors are enclosed in a jointed pipe line filled with insulating fluid under superatmospheric pressure, which method comprises placing the pipe lengths, which are to be jointed, in the trench in which the system is to be buried, raising the adjacent ends of two lengths above the trench bottom and drawing two sets of cable conductors into the pipe lengths, applying a lifting force to each of the pipe lengths at an area sufficiently remote from the free ends of the pipe lengths to permit these ends to sag into substantial alignment with each other above the top of the trench, splicing the two sets of cable conductors to each other, and positioning the joint sleeve in overlapping relation to the ends of the pipe lengths, lowering the jointed pipe into the trench, permanently securing the joint sleeve to the pipe, and then backfilling.

CHARLES E. BENNETT.

REFERENCES CITED

The following references are of record in the file of this patent:

UNITED STATES PATENTS

| Number | Name | Date |
|---|---|---|
| 306,057 | Chase | Oct. 7, 1884 |
| 461,677 | Greenfield | Oct. 20, 1891 |
| 1,877,974 | Robb | Sept. 20, 1932 |
| 1,877,975 | Robb | Sept. 20, 1932 |
| 2,099,291 | Bennett | Nov. 16, 1937 |